United States Patent

Xue et al.

[11] Patent Number: 6,005,783
[45] Date of Patent: Dec. 21, 1999

[54] METHOD OF SYNTHESIZING POLY-PHASE AC VOLTAGE

[75] Inventors: Yanhong Xue, Indianapolis, Ind.; Alexander Kurnia, Wheaton, Ill.; Kaushik Rajashekara, Carmel, Ind.; Edward Oliver Allen, Madison, Wis.

[73] Assignee: General Motors Corporation, Detroit, Mich.

[21] Appl. No.: 09/105,806

[22] Filed: Jun. 26, 1998

[51] Int. Cl.$^6$ ........................................... H02M 3/36
[52] U.S. Cl. ............................................. 363/36
[58] Field of Search ............................. 363/36, 34, 35, 363/95

[56] References Cited

U.S. PATENT DOCUMENTS 3,644,820  2/1972  Ainsworth ............................... 363/149

OTHER PUBLICATIONS

S. Fukuda, Y. Iwaji and S. Sano, "Introduction of the Harmonic Distortion Determing Factor and Its Application to Evaluating Real Time PWM Inverters", Conf. Rec. 1993 IEEJ Hokkaido Branch Conv. pp. 1130–1135.

D.M.Divan, T.A.Lipo, T.G.Habetler, "PWM Techniques for Voltage Source Inverters", Tutorial Notes, IEEE PESC 1990.

H.W.Van der Broeck, "Analysis of the Harmonics in Voltage Fed Inverter Drives caused by PWM schemes with Discontinuous Switching Operations", EPE 1991, pp.3–261 –3–266.

J.S.Kim, S.K. Sul, "A Novel Modulation Technique of the Space Vector PWM", IPEC 1995, Yokohama Japan, pp. 742–747.

D. Lee and G. Lee, "Linear Control of Inverter Output Voltage in Overmodulation", IEEE Transactions On Industrial Electronics, vol. 44 #4, Aug. 1997, pp. 590–592.

V. Kaura, "A New Method to Linearize Any Triangle Comparison Based PWM By Reshaping The Modulation Command" IEEE, 1996, pp. 927–933.

A. Have, T. Lipo, R. Kerkman, "Carrier Based PWM–VSI Overmodulation Strategies", WEMPEC Review Meeting 1996, pp. 1–8.

A. Schonung & H. Stremier, "Static Frequency Changers with Subharmonic Control in Conjunction with Reversible Variable–Speed AC Motor Drives", Brown Boveri Review, vol. 51, Aug./Sep. 1964, pp. 555–576.

J.A.Houldsworth and D.A.Grant, "The Use of Harmonic Distortion to Increase the Output Voltage of a Three–Phase PWM Inverter", IEEE Transactions on IAS, vol. 1A–20, #5, Sep./Oct., 1984, pp. 1224–1228.

T.Ohnishi & H.Okitsu, "A Novel PWM Technique for a Three–Phase Inverter/Converter", IPEC Proceedings, Tokyo, 1983, pp. 384–395.

H.W.Van der Broeck, H.–Ch. Skudelny, and G. Stanke, "Analysis and Realization of Pulse Width Modulator Based on Voltage Space Vectors", IEEE–IAS Annual Meeting Conf. Rec. 1986, pp. 244–251.

S. Kukuda, Y.Iwaji and H.Hasegawa, "PWM Technique For Inverter With Sinusoidal Output Current", IEEE Trans. Power Electronics, vol. 5, #1, Jan. 1990, pp. 54–60.

*Primary Examiner*—Shawn Riley
*Attorney, Agent, or Firm*—Vincent A. Cichosz

[57] ABSTRACT

A three-phase invertor and control is disclosed for synthesizing low harmonic content AC voltage in the non-linear, or overmodulation, region of inverter operation. A field orientation control provides a reference voltage vector representing the desired AC output voltage in magnitude and angle. Three state, two state, and step inverter operations are used individually and in combinations in accordance with magnitude and angle parameters of the reference voltage vector.

28 Claims, 10 Drawing Sheets

| REGION |
|---|
| II |
| 3 STATE |

| | $\sqrt{3}\, V_Y^* < 1$ | |
|---|---|---|
| Y | | N |

| $T_1 = K\left(V_X^* + \dfrac{V_Y^*}{\sqrt{3}}\right)$ $T_2 = K\left(-V_X^* + \dfrac{V_Y^*}{\sqrt{3}}\right)$ | 6 STEP $\dfrac{3}{2}V_X^* + \dfrac{\sqrt{3}}{2}V_Y^* > 1$ OR $-\dfrac{3}{2}V_X^* + \dfrac{\sqrt{3}}{2}V_Y^* > 1$ | |
|---|---|---|
| | Y / N | |
| | REGION HALF $V_X^* \geq 0$ | $T_1 = T_S \left[\dfrac{(\sqrt{3}\, V_X^* + V_Y^*)}{(2\, V_Y^*)}\right]$ $T_2 = -T_S \left[\dfrac{(\sqrt{3}\, V_X^* - V_Y^*)}{(2\, V_Y^*)}\right]$ |
| | Y / N | |
| | $T_1 = T_S$, $T_2 = 0$ \| $T_1 = 0$, $T_2 = T_S$ | |

$T_0 = T_S - T_1 - T_2$

| | $MI > K_m$ | |
|---|---|---|
| Y | | N |
| $T_A = T_1$ $T_B = T_1 + T_2$ $T_C = 0$ | | $T_A = T_1 + \dfrac{T_0}{2}$ $T_B = T_1 + T_2 + \dfrac{T_0}{2}$ $T_C = \dfrac{T_0}{2}$ |

FIG. 7

| REGION |
|---|
| III |
| 3 STATE |

| Y | $-\frac{3}{2}V_X^* + \frac{\sqrt{3}}{2}V_Y^* < 1$ | N |
|---|---|---|

| $T_1 = K\left(\frac{2V_Y^*}{\sqrt{3}}\right)$ $T_2 = -K\left(V_X^* + \frac{V_Y^*}{\sqrt{3}}\right)$ | 6 STEP | | | |
|---|---|---|---|---|
| | Y | $\sqrt{3}V_Y^* > 1$ OR $-\frac{3}{2}V_X^* - \frac{\sqrt{3}}{2}V_Y^* > 1$ | | N |
| | | REGION HALF | | |
| | Y | $\frac{-V_X^*}{\sqrt{3}} < V_Y^*$ | N | $T_1 = T_S \left[\frac{(2V_Y^*)}{(-\sqrt{3}V_X^* + V_Y^*)}\right]$ $T_2 = T_S \left[\frac{(-\sqrt{3}V_X^* - V_Y^*)}{(-\sqrt{3}V_X^* + V_Y^*)}\right]$ |
| | $T_1 = T_S$ $T_2 = 0$ | $T_1 = 0$ $T_2 = T_S$ | | |

$T_0 = T_S - T_1 - T_2$

| Y | MI > $K_m$ | N |
|---|---|---|
| $T_A = T_0$ $T_B = T_S$ $T_C = T_2 + T_0$ | | $T_A = \frac{T_0}{2}$ $T_B = T_1 + T_2 + \frac{T_0}{2}$ $T_C = T_2 + \frac{T_0}{2}$ |

FIG. 8

| REGION |
|---|
| IV |
| 3 STATE |

| Y $-\frac{3}{2}V_X^* - \frac{\sqrt{3}}{2}V_Y^* < 1$ | | | N |
|---|---|---|---|
| $T_1 = K(-V_X^* + \frac{V_Y^*}{\sqrt{3}})$ $T_2 = K\frac{(2V_Y^*)}{\sqrt{3}}$ | Y $-\frac{3}{2}V_X^* + \frac{\sqrt{3}}{2}V_Y^* > 1$ OR $-\sqrt{3}V_Y^* > 1$ 6 STEP | | N |
| | Y $\frac{-V_X^*}{\sqrt{3}} > -V_Y^*$ REGION HALF N | $T_1 = T_S \left[\frac{(-\sqrt{3}V_X^* + V_Y^*)}{(-\sqrt{3}V_X^* - V_Y^*)}\right]$ | |
| | $T_1 = T_S$ $T_2 = 0$ | $T_1 = 0$ $T_2 = T_S$ | $T_2 = T_S \left[\frac{2V_Y^*}{(\sqrt{3}V_X^* + V_Y^*)}\right]$ |

$T_0 = T_S - T_1 - T_2$

| Y | MI > $K_m$ | N |
|---|---|---|
| $T_A = 0$ $T_B = T_1$ $T_C = T_1 + T_2$ | | $T_A = \frac{T_0}{2}$ $T_B = T_1 + \frac{T_0}{2}$ $T_C = T_1 + T_2 + \frac{T_0}{2}$ |

FIG. 9

REGION VI

3 STATE

$\frac{3}{2}V_X^* - \frac{\sqrt{3}}{2}V_Y^* < 1$ ?

Y:
$$T_1 = -K\left(\frac{2V_Y^*}{\sqrt{3}}\right)$$
$$T_2 = K\left(V_X^* + \frac{V_Y^*}{\sqrt{3}}\right)$$

N: 6 STEP

$-\sqrt{3} * V_Y^* > 1$ OR $\frac{3}{2}V_X^* + \frac{\sqrt{3}}{2}V_Y^* > 1$ ?

Y: REGION HALF

$\frac{V_X^*}{\sqrt{3}} < -V_Y^*$ ?

- Y: $T_1 = T_S$, $T_2 = 0$
- N: $T_1 = 0$, $T_2 = T_S$

N:
$$T_1 = T_S \left[\frac{-2V_Y^*}{(\sqrt{3}V_X^* - V_Y^*)}\right]$$
$$T_2 = T_S \left[\frac{(\sqrt{3}V_X^* + V_Y^*)}{(\sqrt{3}V_X^* - V_Y^*)}\right]$$

$$T_0 = T_S - T_1 - T_2$$

MI > $K_m$ ?

Y:
$T_A = T_1 + T_2$
$T_B = 0$
$T_C = T_1$

N:
$T_A = T_1 + T_2 + \frac{T_0}{2}$
$T_B = \frac{T_0}{2}$
$T_C = T_1 + \frac{T_0}{2}$

FIG. 11

METHOD OF SYNTHESIZING POLY-PHASE AC VOLTAGE

TECHNICAL FIELD

The present invention is related to inverter control.

BACKGROUND OF THE INVENTION

Inverters are used to convert a DC input voltage into poly-phase AC output voltage for application, for example, to poly-phase stator windings of an electric motor. Advances in power bridge electronics, such as fast switching power semiconductor devices, and advances in control electronics, such as digital signal processors, has led to widespread use of high frequency pulse width modulation techniques of inverter control which allows for relatively precise control of stator voltages and correspondingly precise control over stator currents. Additionally, direct and indirect vector control topologies, which rely upon real-time processing capabilities, have advanced particularly well in light of these advances.

For AC machine drive applications, full utilization of the DC supply voltage is critical in attaining maximum machine output torque and high efficiency. This is particularly important in such applications as vehicle drivelines in electric or electric-hybrid vehicles. It is therefore advantageous that inverter controls make use of output voltage capability of inverters into the non-linear or overmodulation regions. Another competing consideration of substantial importance in vehicle driveline applications is purity of the power output or, put another way, the absence of power output harmonics which are generally undesirable.

Heretofore, known techniques for providing AC output voltages through DC power links and inverter controls have had limited utilization of the DC supply voltage due to unacceptably high harmonic content at the output. This is particularly true in the non-linear or overmodulation region of inverter control. Hence, it is desirable to maximize the DC supply voltage utilization while simultaneously providing a relatively harmonically clean AC output voltage.

SUMMARY OF THE INVENTION

The present invention controls a three-phase inverter to synthesize AC voltage from a DC link. The inverter is characterized by three phase legs and six non-zero inverter states for coupling the DC bus voltage across various combinations of the phase loads, typically phase windings of a stator in a rotating electric machine. At least one zero inverter state is available for effectively decoupling the DC bus from across any phase load. Each non-zero inverter state provides a voltage characterized by an angular orientation with respect to a reference frame. Angularly adjacent non-zero voltage vectors corresponding to respective non-zero inverter states delimit respective angular regions.

A reference voltage vector is provided, for example by any well known field orientation control. AC output voltage is synthesized in response to the reference voltage vector by commutating among and between the various inverter states. More specifically, the commutation is among and between the non-zero inverter states which correspond to adjacent voltage vectors on either side of the reference voltage vector and, as the case may be, at least one zero inverter state.

Reference voltage vectors which are magnitudinally less than a first threshold result in synthesis of an output voltage, corresponding in angle to the reference voltage vector, through modulation of the non-zero inverter states corresponding to the adjacent voltage vectors on either side of the reference voltage vector and at least one zero inverter state. Reference voltage vectors which are magnitudinally not less than the first threshold yet less than a second threshold result in synthesis of an output voltage, corresponding in angle to the reference voltage vector, through modulation of only the non-zero inverter states corresponding to the adjacent voltage vectors on either side of the reference voltage vector. Reference voltage vectors which are magnitudinally not less than the second threshold result in synthesis of an output voltage through maintenance of the respective one of the non-zero inverter states corresponding to the adjacent voltage vectors on either side of the reference voltage vector which is angularly closest to the reference voltage vector.

In accord with a preferred implementation, the first threshold is established for each region as the voltage vector locus corresponding to complementary fractions of angularly adjacent non-zero voltage vectors that subtend the reference voltage vector. Similarly, for each region, the second threshold preferably comprises extrapolations of the voltage vector loci associated with the adjacent regions.

BRIEF DESCRIPTION OF THE DRAWINGS

The present invention will now be described, by way of example, with reference to the accompanying drawings, in which:

FIGS. 6–11 illustrate preferred sets of equations for carrying out the steps illustrated in the flow diagram of FIG. 5 for each respective region of inverter operation as illustrated in FIGS. 2 and 3 with respect to the exemplary three-phase electric machine system as illustrated in FIG. 1; and, FIG. 12 is a graphical comparison of total AC output voltage harmonics through the non-linear response region of a three-phase inverter controlled in accordance with the present invention with those of a three-phase inverter controlled in accordance with an alternative method.

DESCRIPTION OF THE PREFERRED EMBODIMENT

Figure 1:
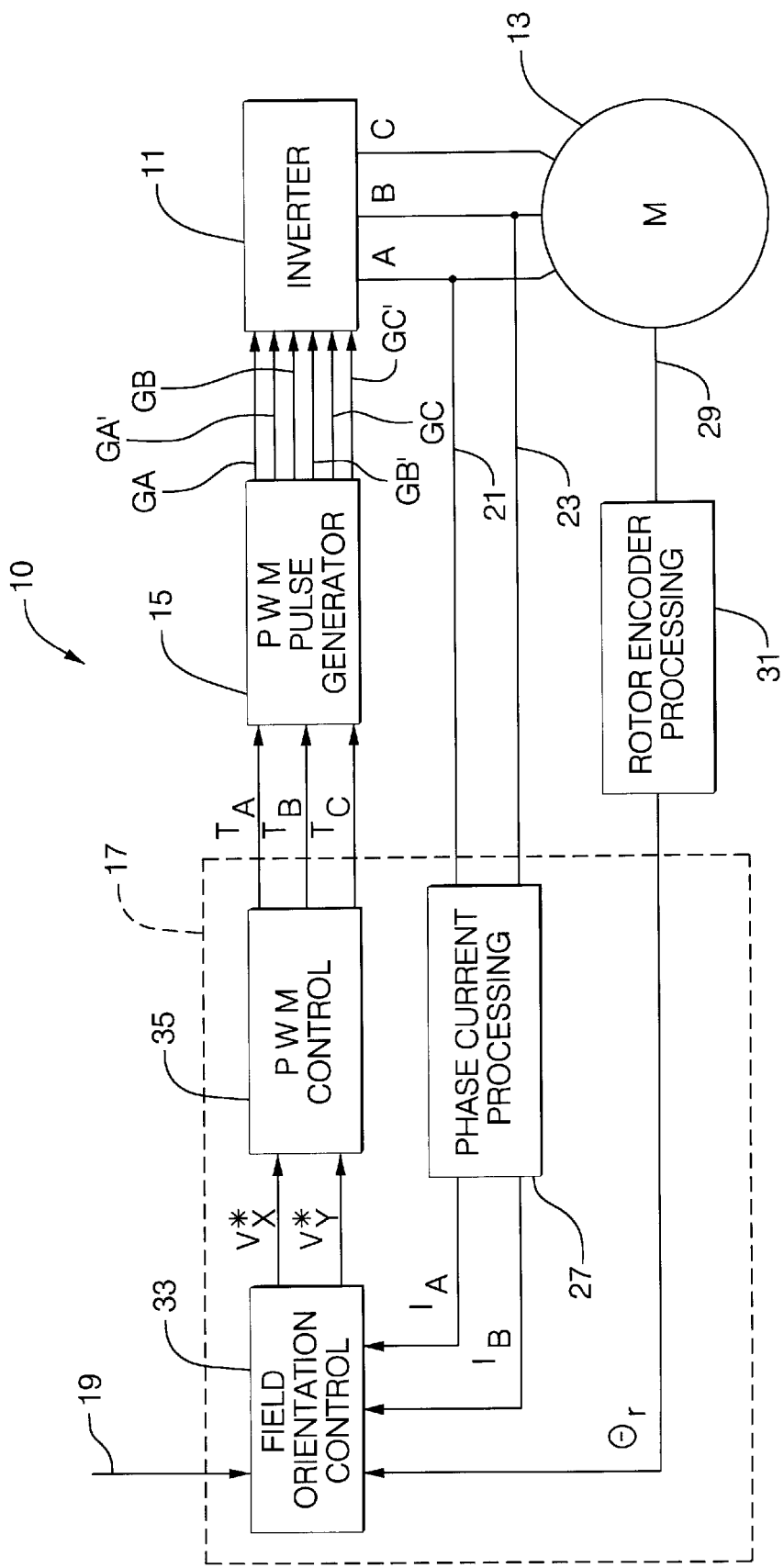
FIG. 1 illustrates a block diagram of an exemplary three-phase electric machine system including PWM control in accordance with the present invention.

With reference first to FIG. 1, a block diagram of an exemplary three-phase electric machine system including PWM control in accordance with the present invention is generally labeled with the reference numeral 10. The figure is generally partitioned into microcontroller (e.g. digital signal processor (DSP)) 17 shown by the control blocks enclosed by the broken line and the remaining system elements external to the broken line. DSP 17 may be any general purpose digital signal processor including, though not separately illustrated, such conventional DSP hardware elements as a microprocessor with math co-processor, input/ output circuitry including high resolution A/D and D/A conversion, high speed clock, ROM, RAM, and data bus, which is adapted through software programming for implementing the control of the present invention. A three-phase system is chosen for illustration of the principles of the invention with the understanding that the invention is applicable to poly-phase electric machine systems in general and not limited by the particular number of phase voltages. Beginning with the blocks external to the DSP 17 at the far right of the figure, the inverter block 11 is a hard switched three-phase inverter. Though not separately illustrated, it is understood that DC link topologies including, for example, resonant or quasi-resonant topologies which advantageously provide for soft switching opportunities of voltage and/or current by the inverter bridge electronics, may similarly be employed in conjunction with the present invention. The inverter block 11 also includes bridge electronics, not separately illustrated, including three phase legs each coupled across the upper and lower DC rails of the DC link and providing respective phase outputs labeled A, B, and C in the figure. Each phase leg of the inverter 11 includes a pair of solid state power switches, such as insulated gate bipolar transistors (IGBTs) including anti-parallel diodes, coupled in series across the DC rails for a total of six such power switches in the exemplary three-phase system. The common node of each power switch pair provides the respective one of the phase outputs A, B, and C.

Each power switch of the inverter bridge is individually responsive to a respective gating signal on lines labeled GA–GC and GA'–GC' in the figure wherein the second letter of each gating signal line designation corresponds to the similarly designated phase leg of the inverter by convention. The primed and unprimed designations of the gating signal lines, also by convention, correspond to one or the other of the upper and lower power switches which make up the corresponding phase leg. Each gating signal drives the respective power switch conductive or non-conductive with the convention that no two gating signals controlling the power switches of the same phase leg simultaneously drive those power switches conductive. The gating signals are generated by PWM pulse generator block 15, the tasks of which, in the present embodiment, are performed by a discrete integrated circuit such as ADMC201 PWM chip, available from Analog Devices, which operates as a co-processor with the DSP 17 to provide the desired gating signals including programmed deadtime. Of course, it will be recognized that, as a matter of choice, the tasks of PWM pulse generator block 15 may be included in the DSP through additional control software overhead provided sufficient digital output channels are available for direct output to the inverter or other intermediate interface circuitry.

The phase outputs A, B, and C of the inverter 11 provide excitation voltage A–B, B–C, and C–A to three-phase windings of the electric machine 13. Most frequently, the three-phase windings of machine 13 are stator windings in a rotating machine such as an induction motor which is presumed in the present exemplary application. Such machines are capable of operating in a motoring mode for imparting output torque to an output shaft coupled to the rotor of the machine, not separately shown, or a generating mode for accepting input torque at the output shaft for example through the drivetrain of an automobile for kinetic energy reclamation through regenerative braking of the machine.

Phase current sensing is accomplished on phase outputs A and B by any appropriate current sense apparatus such as, for example, hall effect current sensors or current shunts. Lines 21 and 23 provide analog signals corresponding to the phase currents through phase outputs A and B, respectively, to DSP 17. Filtering of the analog signal is preferably performed to remove harmonics and the filtered signals converted to digital signals within the phase current processing block 27 to obtain phase current signals Ia and Ib. Rotor speed and positional information is derived by conventional means such as an optical rotor encoder, not separately illustrated. The rotor encoder is fixed to the rotor shaft to rotate therewith The encoder arrangement provides an analog signal on line 29 for binary conversion by DSP such as by well known comparator circuitry. Alternatively, the signal on line 29 may have been pre-processed with sensor integrated electronics to provide a binary signal on line 29. The rotor encoder processing block 31 therefore may provide for binary conversion if necessary by the character of the signal supplied thereto on line 29, and provides for decoding of the binary information to obtain the rotor angular position θr and rotor speed and derivatives not specifically called out in the figure.

The phase currents Ia and Ib and the rotor angular position θr are inputs to the field orientation control block 33. Additionally, external inputs such as a torque, speed, or position commands are provided to the field orientation control block 33, as illustrated by line 19, in accordance with the field orientation control objectives. The general objective of the field orientation control block 33 is to derive a reference voltage vector representing the desired fundamental voltage for the machine stator windings which will result in the desired stator flux and torque. Other non-limiting examples of control block topologies include slip control, voltage-frequency control, or any other strategy that generates a reference voltage vector V* in magnitude and angle. The particular control block topologies are not critical to the implementation of the present invention and hence are not described in further detail.

The reference voltage vector output from the field orientation control includes magnitude and angle information fully characterizing the desired fundamental voltage. In the present exemplary system, the reference voltage vector V* magnitude and angular information are represented by orthogonal voltage vector components Vx* and Vy* with respect to a Cartesian reference frame, the resultant vector comprising the desired fundamental voltage. Alternatively, the reference voltage vector V* may be represented by a magnitude and angle with respect to polar or phase reference frames. In any case, the reference voltage vector V* is provided with respect to a stationary reference frame whether it be Cartesian, polar, phase, or other. The reference voltage vector output is provided to the PWM control block 35.

PWM control block 35 provides the functions of resolving the reference voltage vector V* from the field orientation control 33 into appropriate pulse distribution signals TA, TB, and TC for input to the PWM pulse generator block 15. Generally, among the functions performed by the PWM control block 35 are determination of the angular region of inverter operation including appropriate inverter states, selection and combinations of and between various modes of inverter control, determining vector state times, and minimizing inverter bridge switching loss. These functions will be described in detail with respect to the remaining figures.

Figure 2:
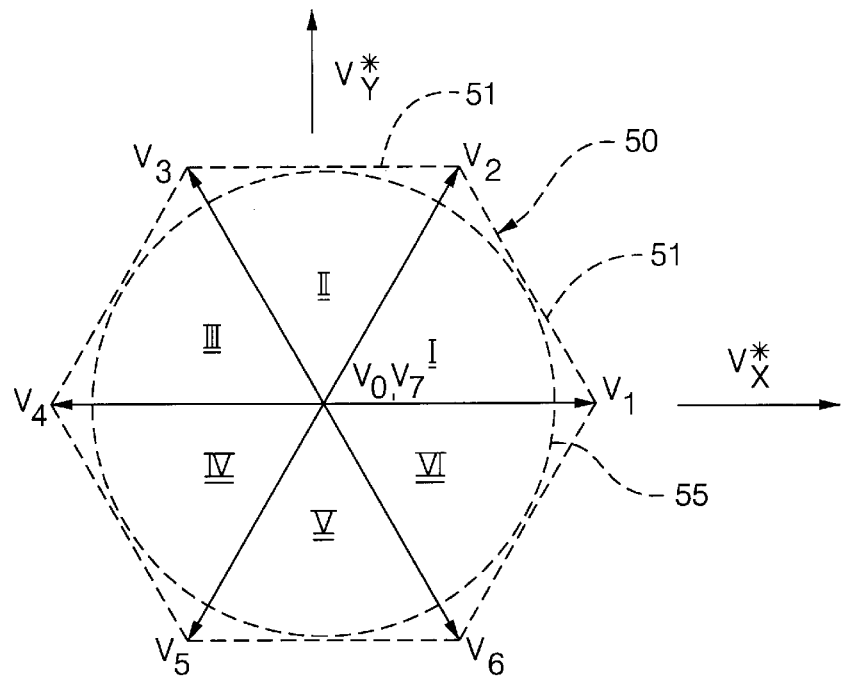
FIG. 2. graphically illustrates a two-dimensional projection against orthogonal Cartesian axes Vx* and Vy* of voltage vectors (V0–V7) corresponding to the inverter states of an exemplary three-phase electric machine system as illustrated in FIG. 1.

Turning now to FIG. 2, unit voltage vectors V0–V7 are shown projected against a Cartesian reference frame having orthogonal axes Vx* and Vy* defining quadrants. The axis Vx* is positive to the right of the origin (i.e. intersection of the Vx* and Vy* axes) and negative to the left thereof. Similarly, the Vy* axis is positive above the origin and negative therebelow. By convention, the angle of a voltage vector emanating from the origin is defined by its counterclockwise traversal from the positive portion of the Vx* axis. The voltage vectors correspond to the available inverter states within the capability of a three-phase inverter. Voltage vectors V0–V7 may interchangeably be referred to herein as voltage vectors or inverter states. Voltage vectors V0 and V7 are zero voltage vectors each corresponding to one or the other inverter state configuration of the upper bank of inverter power switches closed with the lower bank of inverter power switches open, or the lower bank of inverter power switches closed with the upper bank of inverter power switches open. In an inverter state corresponding to a zero voltage vector, the DC link of the inverter is effectively decoupled from across any phase of the three-phase stator winding. Hence, V0 and V7 are seen to be at the origin of the reference frame without magnitude or angle and, in the reference frame of interest, the two zero inverter states V0 and V7 are equivalent. It is to be understood that reference to zero inverter states refers to the inverter states corresponding to the zero voltage vectors V0 and V7. Voltage vectors V1–V6 on the other hand are non-zero voltage vectors, each corresponding to a particular inverter state configuration of upper and lower banks of inverter power switches. Each inverter state corresponding to a non-zero voltage vector couples the DC link across the various phases of the three-phase stator winding in a manner which results in one of the six voltage vectors V1–V6 having magnitude and angle as shown in the figure. Angularly adjacent ones of the non-zero voltage vectors (e.g. V1–V2, V2–V3, etc.) define respective angular regions therebetween which are labeled in the figure with roman numerals I–VI. It is to be understood that reference to non-zero inverter states refers to the inverter states corresponding to the non-zero voltage vectors V1–V6 and reference to adjacent non-zero inverter states refers to the inverter states corresponding to adjacent ones of the non-zero voltage vectors.

A variety of combination techniques are known for synthesis of voltages corresponding to voltage vectors at angles other than the discrete angles occupied by the voltage vectors V1–V6. Combinations of two adjacent non-zero voltage vectors and at least one of the two zero voltage vectors, for example, synthesize voltages corresponding to voltage vectors that are angularly included within the region between, or are subtended by, the selected two adjacent non-zero voltage vectors. Inverter control in this regard partitions a given sampling period into three durations; one for each of the two inverter states corresponding to the adjacent non-zero voltage vectors and one for at least one of the two inverter states corresponding to the seder voltage vectors. With such a three-state synthesis (i.e. modulation among two adjacent non-zero inverter states and at least one zero inverter state), the magnitude of the voltage so synthesized is related to the respective durations of the non-zero inverter states and the total duration of the zero inverter states. Generally, the magnitude of the voltage so synthesized increases with decreasing durations of zero inverter states and vice-versa. This is generally accepted as a linear region of operation wherein the fundamental output voltage is proportional to a reference voltage vector of the control. In FIG. 2, such linear operation is represented by operation within the area of the major circle 55 which itself represents the maximum steady state fundamental voltage synthesizable with three-state synthesis.

Likewise, combinations of only two adjacent non-zero inverter states to the exclusion of the two zero inverter states, also synthesize voltages corresponding to voltage vectors that are angularly included within the region between, or are subtended by, the selected two adjacent non-zero inverter states. Inverter control in this regard partitions a given sampling period into two durations only; one for each of the two adjacent non-zero inverter states. However, with such a two-state synthesis (i.e. modulation among only two adjacent non-zero inverter states), the magnitude of the voltage so synthesized is related only to the respective durations of the non-zero inverter states. The magnitude of the voltage so synthesized is fixed for a given angle. This may be referred to as hexagon locus operation with a three-phase inverter since continuous operation as such results in voltage synthesis with a voltage vector which traces along the hexagonally shaped voltage vector locus 50 made up of six sides, or individual region locus 51 as shown in FIG. 2.

In either of the two-state or three-state synthesis, each sampling period comprises complementary fractional contributions of the inverter states corresponding to the voltage vectors used in the synthesis. For example, if a reference voltage falls within region I and three-state synthesis is employed, the synthesis is accomplished for each sampling period with respective durations of inverter states corresponding to voltage vectors V1, V2, and one or both of V0 and V7 wherein the respective durations sum to the sampling period. The durations are typically expressed as duty cycles. Similarly, if a reference voltage falls within region I and two-state synthesis is employed, the synthesis is accomplished for each sampling period with respective durations of inverter states corresponding only to voltage vectors V1 and V2, wherein the respective durations sum to the sampling period. In each case, the durations represent fractional contribution of the voltage vectors which are complementary with respect to summing to the total duration of the sampling period. In the reference frame, the hexagonal locus 50 corresponds to a voltage vector locus corresponding to complementary fractions of only adjacent pairs of the non-zero voltage vectors.

In addition, step operation of the three-phase inverter is known wherein each non-zero inverter state is held or maintained in succession for 60 degrees of the AC cycle.

Figure 3:
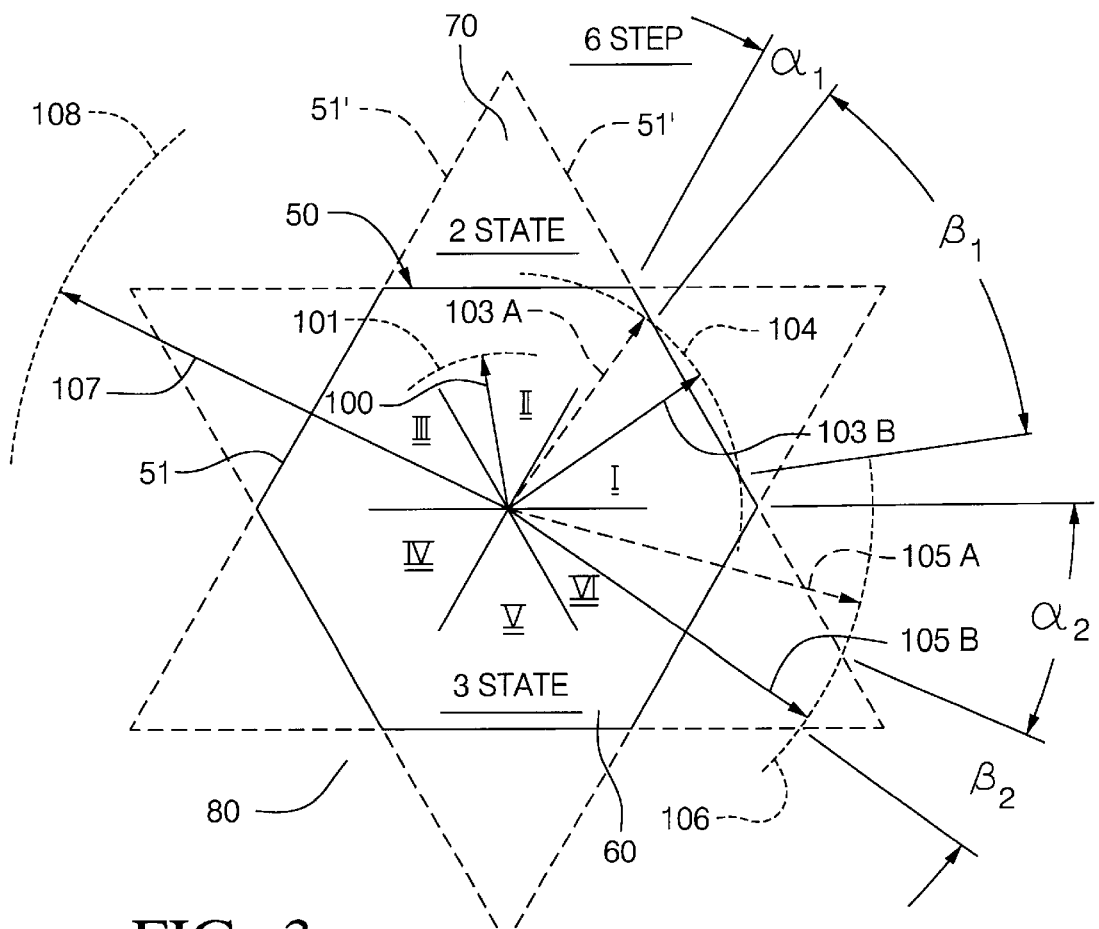
FIG. 3 graphically illustrates a two-dimensional projection against orthogonal Cartesian axes Vx* and Vy* as shown in FIG. 2 of certain voltage vector loci and voltage vector parameters of a preferred embodiment of the present invention.

With reference now to FIG. 3 in addition to FIG. 2, the reference frame of FIG. 2 is essentially carried over to FIG. 3. The unit vectors V1–V6 have been dropped from FIG. 3 for clarity, however, the orientation and labeling of the regions remains intact for continuity of reference. The hexagon voltage vector locus 50 representing the previously described two-state synthesis path is now shown in solid line to provide clarity in light of certain additions to the reference frame in FIG. 3. The reference frame is seen to be divided into three areas of general mutual exclusivity which correspond to respective modes of inverter operation when the reference voltage vector lies therein as will be described. One such area 60 is defined, in the present embodiment, within the hexagon voltage vector locus 50 and corresponds to three-state synthesis generally labeled 3 STATE in the figure. Another such area 70 is defined, in the present embodiment, as the respective triangular area for each region I–VI, enclosed by the respective side 51 and the hexagon voltage vector locus extrapolations 51' of the sides 51 associated with the adjacent regions. This triangular area corresponds to two-state synthesis and is generally labeled 2 STATE in the figure. Finally, a third area 80 is defined, in the present embodiment, external to both the hexagon voltage vector locus 50 and the triangular areas. This area corresponds to step synthesis and is generally labeled 6 STEP in the figure.

Four exemplary steady state reference voltage vector scenarios will be presented in exposition of the principles of the present invention in synthesizing AC output voltage with a three-phase inverter. Steady state when used herein with respect to reference voltage vectors is understood to mean a magnitudinally constant reference voltage vector through angular progression thereof. Synthesis of AC output voltage by a three-phase inverter in response to a reference voltage vector 100 whose magnitude progresses angularly along the arc labeled 101 is fully accomplished in accord with three-state synthesis exclusively. This is so for all steady state reference voltage vectors having magnitudes which are less than the distance from the origin to the locus of a circle 55 tangentially contacting the sides 51 of hexagonal voltage vector locus 50. For synthesis of AC output voltages in response to a reference voltage vector whose magnitude is greater than the distance from the origin to the locus of circle 55, the other three exemplary scenarios are relevant.

Taking first the reference voltage vector illustrated at two angular positions by vectors 103A and 103B which progresses angularly along the arc labeled 104, it can be seen from inspection of FIG. 3 that the reference voltage vector 103A is within 3 STATE area 60 and synthesis of AC output voltage is performed in accord with three-state synthesis. Similarly, the reference voltage vector 103B is within 2 STATE area 70 and synthesis of AC output voltage is performed in accord with two-state synthesis. If the discussion is limited to a region, such as region I in the present example, then as the reference voltage vector along arc 104 progresses angularly through the region, three-state synthesis is performed for a first duration when the reference voltage vector is within the 3 STATE area 60, and two-state synthesis is performed for a second duration when the reference voltage vector is within the 2 STATE area 70. The first and second durations are illustrated respectively as $\alpha 1$ and $\beta 1$. $\alpha 1$ is from one edge of the region to the angular intersection of arc 104 of the reference voltage vector with the respective side 51 of hexagon voltage vector locus 50. $\beta 1$ is from one angular intersection of arc 104 of the reference voltage vector with the respective side 51 of the hexagon voltage vector locus to the other angular intersection of arc 104 of the reference voltage vector with the respective side 51 of the hexagon voltage vector locus.

Taking next the reference voltage vector illustrated at two angular positions by vectors 105A and 105B which progresses angularly along the arc labeled 106, it can be seen from inspection of FIG. 3 that the reference voltage vector 105B is within 2 STATE area 70 and synthesis of AC output voltage is performed in accord with two-state synthesis. Similarly, the reference voltage vector 105A is within area 80 and synthesis of AC output voltage is performed in accord with six-step synthesis. If the discussion is limited to a region, such as region VI in the present example, then as the reference voltage vector along arc 106 progresses angularly through the region, two-state synthesis is performed for a first duration when the reference voltage vector is within the 2 STATE area 70, and six-step synthesis is performed for a second duration when the reference voltage vector is within the 6 STEP area 80. The first and second durations are illustrated respectively as $\beta 2$ and $\alpha 2$. $\alpha 2$ is from one edge of the region to the angular intersection of arc 106 of the reference voltage vector with the respective hexagon voltage vector locus extrapolation 51' of the side 51 that is most proximally adjacent the respective side included within region VI. $\beta 2$ is from one intersection of arc 106 of the reference voltage vector with one respective hexagon voltage vector locus extrapolation 51' defining one boundary of the 2 STATE area 70 to the other intersection of the reference voltage vector with the other hexagon voltage vector locus extrapolation 51' defining another boundary of the 2 STATE area 70.

Finally, synthesis of AC output voltage by a three-phase inverter in response to a reference voltage vector 107 which progresses angularly along the arc labeled 108 is fully accomplished in accord with six-step synthesis exclusively. This is so for all steady state reference voltage vectors whose magnitudes are greater than the distance from the origin to the point of intersection of the hexagon voltage vector locus extrapolations 51' of the sides 51. For synthesis of AC output voltages in response to a reference voltage vector whose magnitude is not greater than the distance from the origin to the point of intersection of the hexagon voltage vector locus extrapolations 51' of the sides 51, the three previously explored exemplary scenarios are relevant.

Hence, it will be appreciated that within the linear response region of the inverter, that is to say when a steady state reference voltage vector magnitude is less than the distance from the origin to the locus of circle 55 shown in FIG. 2, the AC output voltage is synthesized with pure three-state synthesis. Beyond the linear response region of the inverter, the angle and magnitude of the reference voltage vector are used in the selection and combination of and between the various modes of inverter control (i.e. three-state, two-state, and six-step). Proceeding from the linear region with increasing magnitudes of reference voltage vectors, it can be seen that AC output voltage will first be synthesized through a combination of three-state and two-state synthesis for so long as the increasing reference voltage vector magnitude remains less than the distance from the origin to the apexes of the hexagon voltage vector locus 50. Both $\alpha 1$ is maximum and $\beta 1$ is minimum when the reference voltage vector magnitude immediately exceeds the distance from the origin to the locus of circle 55. From here, increasing reference voltage vector magnitudes result in both decreasing $\alpha 1$ and increasing $\beta 1$ until the reference voltage vector magnitude equals the distance from the origin to the apexes of the hexagon voltage vector locus. At this point, the AC output voltage will be synthesized through a combination of two-state and six-step synthesis for so long as the increasing reference voltage vector magnitude remains less than the distance form the origin to the point of intersection of the hexagon voltage vector locus extrapolations 51' of the sides 51. Both $\beta 2$ is maximum and $\alpha 2$ is minimum when the reference voltage vector magnitude immediately exceeds the distance from the origin to the apexes of the hexagon voltage vector locus. From here, increasing reference voltage vector magnitudes result in both decreasing $\beta 2$ and increasing $\alpha 2$ until the reference voltage vector magnitude equals the distance from the origin to the point of intersection of the hexagon voltage vector locus extrapolations 51' of the sides 51. At this point, and for all greater reference voltage vector magnitudes, the AC output voltage will be synthesized with pure six-step synthesis.

Figure 12:
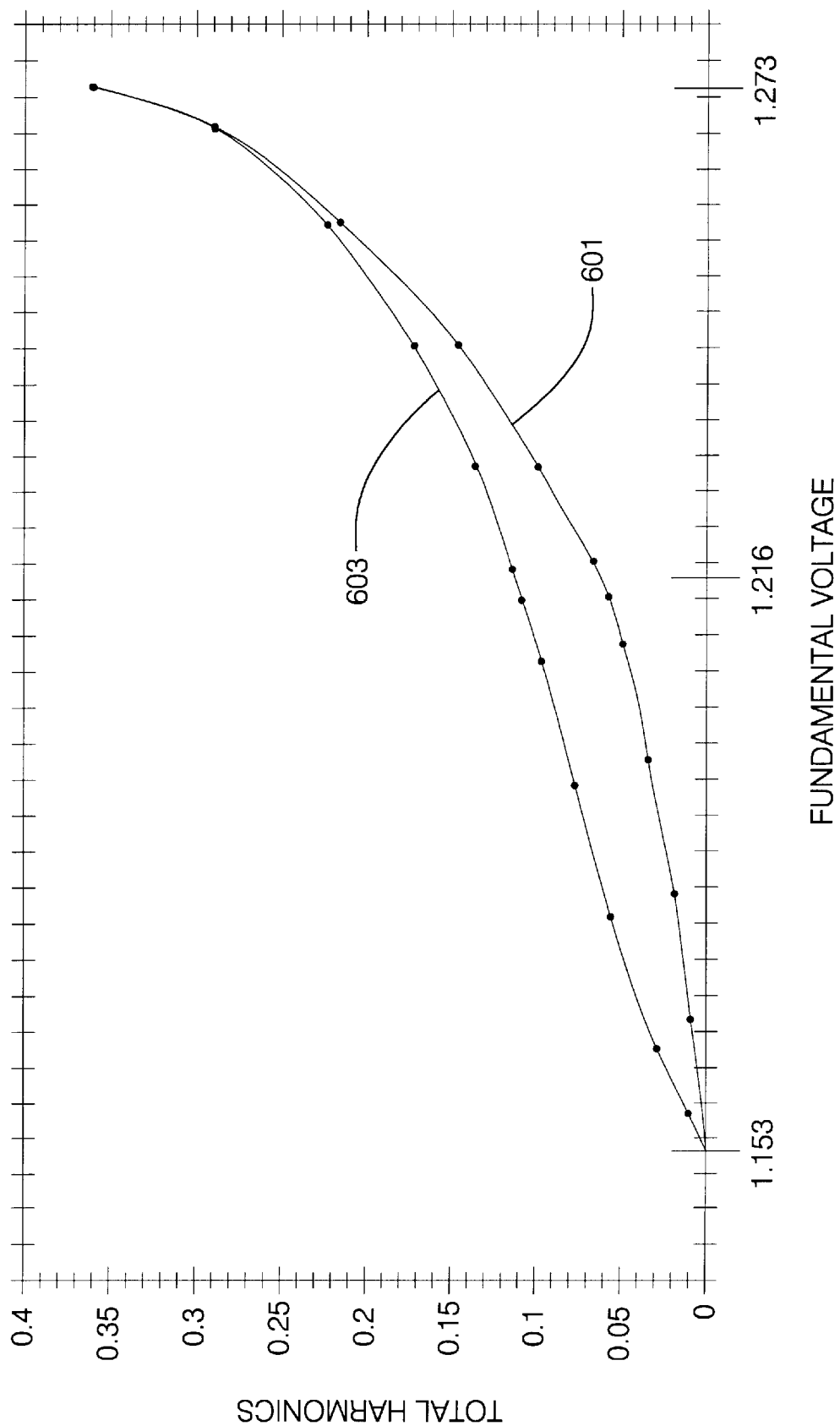

Through simulation testing of a three-phase inverter, wherein throughout the non-linear response region the inverter is controlled in accordance with the present invention wherein the AC output voltage is synthesized using the described combinations of, and transitions between, three-state, two-state, and six-step inverter control, curve 601 of FIG. 12 was developed. This simulation testing of a three-phase inverter was similarly employed to develop curve 603 of FIG. 12, however with the inverter being controlled to synthesize AC output voltage using only the combination of, and transition between, three-state and six-step inverter control. The horizontal axis is the DC bus utilization index—or fundamental frequency component—through the non-linear response region. Specific index values of substantially 1.153 (termination of pure three-state control), 1.216 (pure two-step control), and 1.273 (beginning of pure six-step control) are called out on the axis for reference. The DC bus utilization index is defined as Vøo1/(Vdc/2) wherein Vøo1 is a single phase voltage amplitude and Vdc is the DC link voltage. The vertical axis is the total harmonics with respect to the one-half the DC link voltage. Total harmonics was determined as the square root of the sum of the squares of each order of the harmonics with an inclusive series limit of the 19th order. FIG. 12 demonstrates the substantial attenuation of total harmonics through the non-linear region of control through practice of the present invention. In fact, total harmonics from the present invention are shown to be substantially one-sixth of the total from the compared control at lower DC bus utilization indices, at least substantially one-half of such total through the DC bus utilization index of substantially 1.216, and with continued advantages as the DC bus utilization index approaches the maximum of substantially 1.273.

Figure 4:
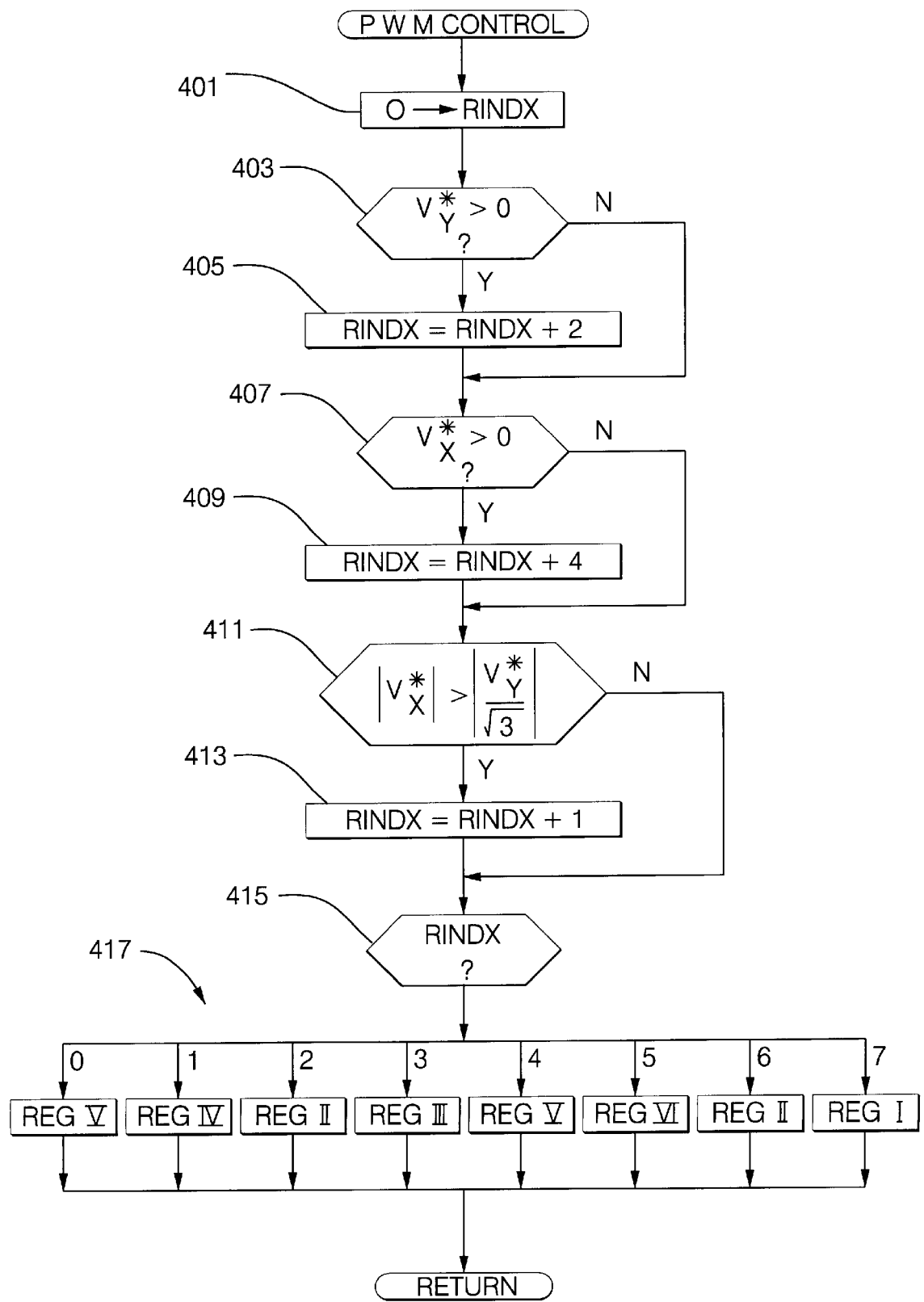
FIGS. 4 and 5 illustrate flow diagrams representing exemplary sets of computer program steps executed in carrying out the control method of the present invention as represented by the PWM control block of FIG. 1 corresponding to an exemplary three-phase electric machine system.
Figure 5:
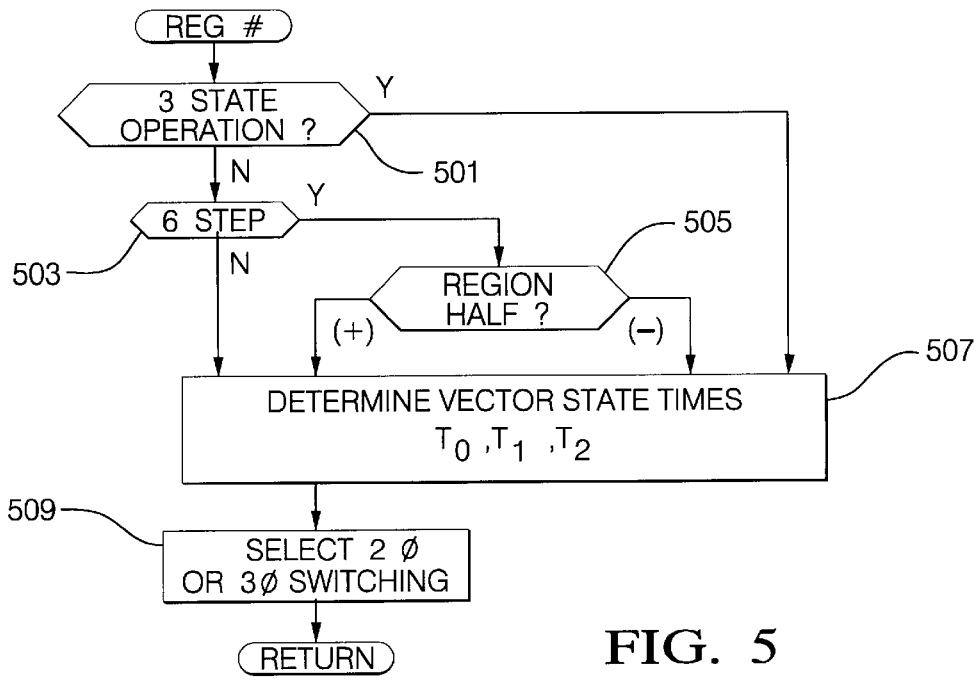

Turning now to FIGS. 4 and 5, flow diagrams representing a set of software program instructions for execution by DSP 17 of FIG. 1 in carrying out the control of the present invention as represented by PWM control block 35. These flow diagrams represent only a portion of a much larger set of instructions executed by DSP 17 for carrying out, for example, such additional control functions as represented by the field orientation control block 33 of FIG. 1. The instructions represented by the flow diagrams of FIGS. 4 and 5 are executed at regular intervals in accordance with the sampling frequency of the inverter control. For example, a sampling frequency of 20 kHz represents execution of these steps each 50 microseconds. The sampling period is this example is 50 microseconds.

The steps shown in FIG. 4 determine which of the regions I–VI the reference voltage vector is within and directs execution of the steps of FIG. 5 to comport with the current region. The manner in which the region determination is made is, in the present example, through a simple algebraically manipulated region index value incremented in accordance with combinational logic of various trigonometric checks performed with the resolved components Vx* and Vy* of the reference voltage vector as provided by the field orientation control block 33. Block 401 first initialized the region index (RINDX) by moving zero into the RINDX register. Block 403 next determines if the Vy* component is positive. A positive Vy* component indicates that the reference voltage vector is within regions I–III and results in execution of block 405 which increments the RINDX register by two. Similarly, a negative Vy* component indicates that the reference voltage vector is within regions IV–VI and results in the bypass of block 405 with the RINDX remaining unchanged. Block 407 next determines if the Vx* component is positive. A positive Vx* component indicates that the reference voltage vector is within regions I, II, V, or VI and results in execution of block 409 which increments the RINDX register by four. Similarly, a negative Vx* component indicates that the reference voltage vector is within regions II–V and results in the bypass of block 409 with the RINDX remaining unchanged. At this stage of the logic, the value of the RINDX register holds enough information to determine in which quadrant, and hence in which two of the six regions, of the reference frame the reference voltage vector lies as follows: RINDX=6; quadrant 1, region I or II; RINDX=2; quadrant 2, region II or III; RINDX=0; quadrant 3, region IV or V; RINDX=4; quadrant 4, region V or VI. Block 411 next determines which of the two regions covered by the quadrant represented by the RINDX register value contains the reference voltage vector. This is accomplished by a check on known ratiometric threshold relationship between the Vx* and Vy* components which indicates whether the region containing the reference voltage vector is the one of the regions which is divided by the Vy* axis (e.g. regions II and V) or the other of the regions bounded on one side by the Vx* axis (e.g. regions I, III, IV, and VI). A value of one increments the RINDX register in the latter case at block 413, and no incrementing of the register occurs in the former case by bypassing block 413. Block 415 next calls a subroutine REG# in accord with the value of the RINDX register. The array of paths 417 illustrate the call of the REG# subroutine with appropriate set of instructions for selection and combination of and between various modes of inverter control (three-state, two-state, and six-step), determining vector state times (T0, T1, and T2), and minimizing inverter bridge switching loss.

The REG# subroutines are illustrated in a general format in FIG. 5 adaptable to each particular region I–VI. FIGS. 6 through 11 illustrate preferred implementations for the steps embodied in the flow diagram of FIG. 5 for each of the regions I–VI, respectively. Generally, the routine of FIG. 5 first determines at block 501 whether three-state synthesis is to be implemented during the present sample period. If so, the steps of blocks 507 and 509 are immediately performed to set the vector state times for three-state synthesis and determine the preferred switching pulse distribution, respectively. If the conditions for three-state synthesis are not met, block 503 determines whether six-step or two-state synthesis is to be implemented during the present sampling period. A negative response at block 503 indicates that two-state synthesis is to be performed and the steps of blocks 507 and 509 are immediately performed to set the vector state times for two-state synthesis and determine the preferred switching pulse distribution, respectively. An affirmative response at block 503 indicates that six-step synthesis is to be performed. Block 505 then determines which half of the present region contains the reference voltage vector for appropriate selection of the vector state times in block 507. The steps of blocks 507 and 509 are then performed to set the vector state times for six-step synthesis and determine the preferred switching pulse distribution, respectively.

Taking the example of the reference voltage vector in region I as determined by the steps of the flow diagram of FIG. 4, the routine of FIG. 5 employs the equations of FIG. 6 as follows. First, block 501 determines if the reference voltage vector is within the hexagon voltage vector locus previously described. In this preferred implementation, a check of the Vx* and Vy* components against known ratiometric limit corresponding to the region I side of a unit hexagon is performed as shown in the block labeled 3-STATE in FIG. 6. Where the limit is not reached, the output voltage may be synthesized by three-state synthesis. Hence, the affirmative response to block 501 results in the setting of the individual vector state times T1 and T2, as shown in the leftmost central box of FIG. 6, for the adjacent non-zero inverter states subtending the reference voltage vector, which, in the present example for region I correspond to the V1 and V2 voltage vectors, respectively. A constant gain K corresponding to the sampling period is applied to the unit duty cycles determined as predetermined functions of the Vx* and Vy* components to provide the active time for each adjacent vector state.

Where block 501 determines the reference voltage vector to be at or beyond the hexagon voltage vector locus the output voltage may not be synthesized by three-state synthesis. Hence, the negative response to block 501 results in block 503 determining if the reference voltage vector, known to be at or beyond the hexagon voltage vector locus, is outside the triangular area previously described. This requires two sets of checks, one corresponding to each one of the intersecting hexagon voltage vector locus extrapolations 51' of the sides 51 defining the outermost sides of the triangular area. In this preferred implementation, separate checks of the Vx* and Vy* components against known ratiometric limits corresponding to the two hexagon voltage vector locus extrapolations 51' of the sides 51 that are adjacent the respective side of the hexagon voltage vector locus within region I. These checks are performed as shown in the block labeled 6-STEP in FIG. 6. Where neither limit is exceeded, the output voltage may be synthesized by two-state synthesis. Hence, the negative response to block 503 results in the setting of the individual vector state times T1 and T2, as shown in the rightmost central box of FIG. 6, for the adjacent non-zero inverter states subtending the reference voltage vector, which, in the present example for region I correspond to the V1 and V2 voltage vectors, respectively. The sampling period Ts is applied to the unit duty cycles determined as predetermined functions of the Vx* and Vy* components to provide the active time for each adjacent vector state.

Where block 503 determines that the reference voltage vector is beyond either limit, the output voltage may be synthesized by six-step synthesis. Hence, the affirmative response to block 503 results in block 505 determining which voltage vector V1 or V2 is closest to the reference voltage vector by determining which angular half of region I contains the reference voltage vector. In this preferred implementation, a ratiometric check of the Vx* and Vy* components against themselves is performed as shown in the box labeled REGION HALF in FIG. 6. Where the reference voltage vector is closest to the voltage vector V1, the vector state time T1 is set to the entire sample period time Ts and the vector state time T2 is set to zero as seen in the left-central block below the REGION HALF block in FIG. 6. Similarly, where the reference voltage vector is closest to the voltage vector V2, the vector state time T2 is set to the entire sample period time Ts and the vector state time T1 is set to zero as seen in the right-central block below the REGION HALF block in FIG. 6.

Following the setting of the vector state times T1 and T2 for the respective selected synthesis, any zero vector state time T0 is set in accord with the relationship shown immediately below all vector state time blocks in FIG. 6. The summation of the zero states T0 and non-zero states T1,T2 is the sample period Ts.

Finally, a determination may be made with respect to a preferred switching pulse distribution. It is recognized that at higher modulation index values, the differences in switching harmonics produced by switching two phase legs versus switching three phase legs becomes less pronounced. As such, the present embodiment selects a pulse distribution scheme in accordance with the value of a conventional modulation index MI to reduce the number of commutations per sample period at higher modulation index values to substantially reduce switching losses with relatively minor increases in switching harmonics, thereby improving efficiency of the system. The modulation index is defined as the reference voltage vector V* divided by the maximum output voltage Vmax. Smaller modulation index values provide a symmetric pulse distribution scheme characterized by six commutations per sample period wherein all three phase legs are commutated. For larger modulation index values, a pulse distribution scheme characterized by four commutations per sample period wherein only the two lowest current phase legs are commutated is provided. The selection of the pulse distribution scheme occurs in the steps of block 509 of FIG. 5 through comparison of the modulation index MI with a calibration constant Km. A calibration constant Km of substantially 0.65 has provided satisfactory results. Where the modulation index exceeds the calibration, two-phase switching is performed and the pulse distribution signals TA, TB, and TC are set in accordance with the relationships illustrated in the lower-left block of FIG. 6. Likewise, where the modulation index does not exceed the calibration, three-phase switching is performed and the pulse distribution signals TA, TB, and TC are set in accordance with the relationships illustrated in the lower-right block of FIG. 6.

Figure 6:
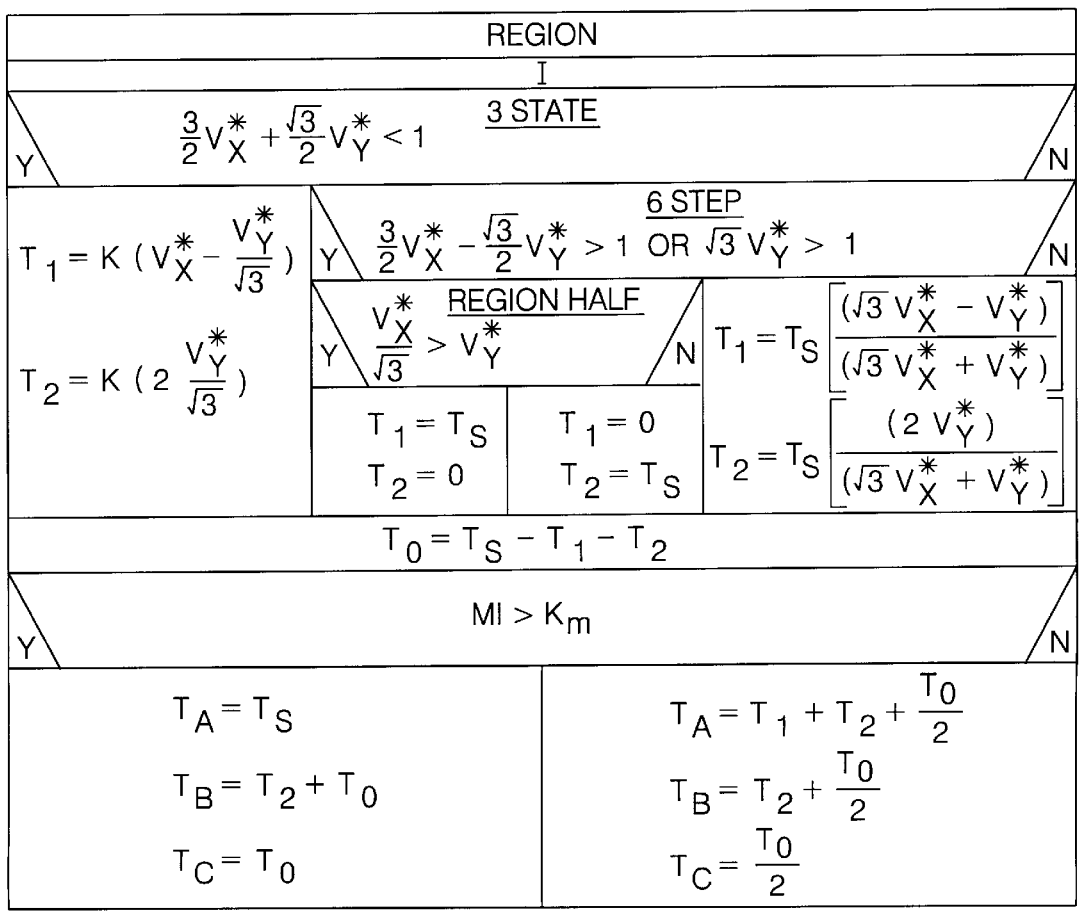
Figure 10:
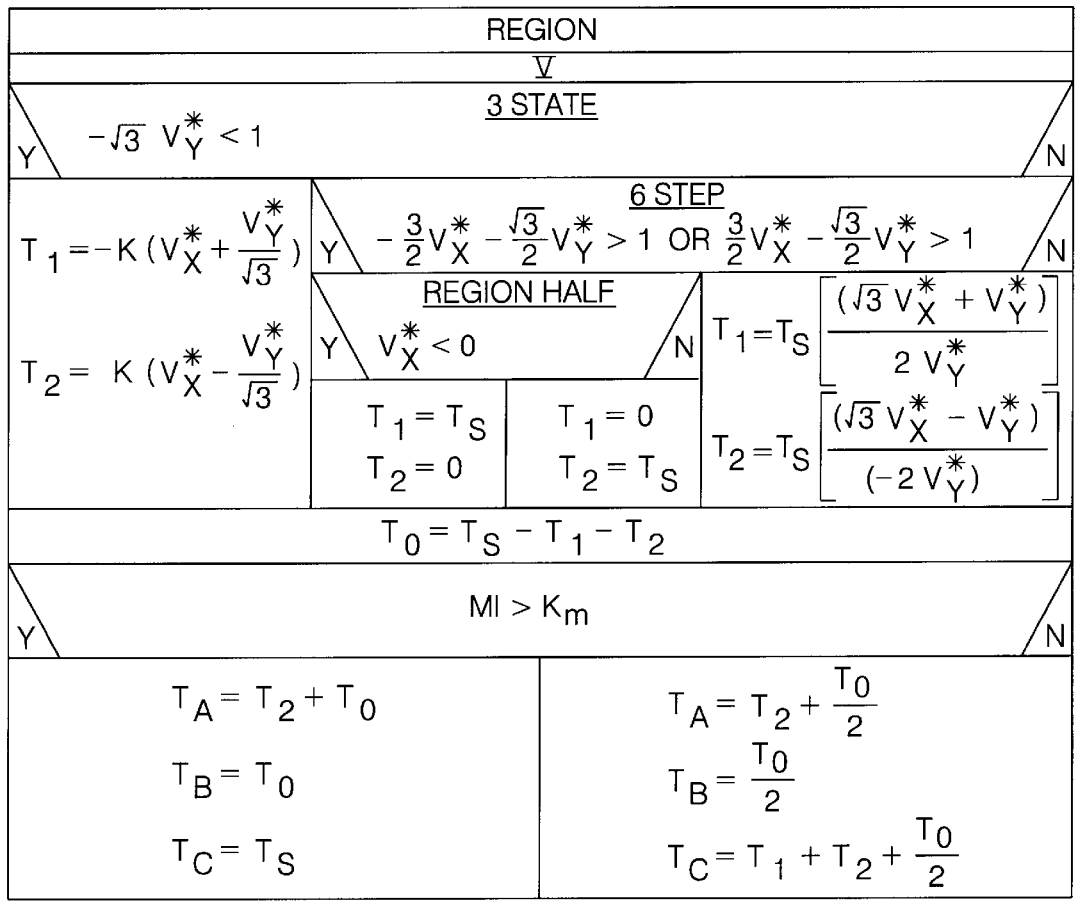

The flow diagram of FIG. 5 has been explained with respect to region I as illustrated in the reference frame of FIGS. 2 and 3 by way of preferred relationships of the Vx* and Vy* components of the reference voltage vector V* as illustrated in FIG. 6. The additional FIGS. 7 through 11 provide similar relationships for implementation in regions II through VI, respectively. One skilled in the art will notice that the each set of relationships of FIG. 6 through FIG. 11 corresponding to progressively adjacent regions reflects the previous set of relationships rotated in the reference frame by the angular coverage of each region of 60 degrees.

The present invention has been described with particularity to certain preferred applications and ancillary control topologies. Additionally, certain preferred manners of implementing the control of the present invention have been disclosed. It is intended, however, that the various examples set forth herein are to be taken by way of non-limiting examples. Those having ordinary skill in the art will recognize that a number of alternatives exist for practicing the invention which is defined by the appended claims.

We claim:

1. A method of synthesizing AC output voltage with a poly-phase inverter having a plurality of power switches for coupling upper and lower DC rails to an inverter output, the inverter characterized by a plurality of inverter states corresponding to respective angularly distributed non-zero voltage vectors and at least one zero voltage vector, wherein angularly adjacent ones of said non-zero voltage vectors delimit respective regions, said inverter states corresponding to predetermined state configurations of said power switches, the method, comprising the steps of:

providing a reference voltage vector having magnitude and angle;

modulating the inverter states corresponding to the angularly adjacent non-zero voltage vectors that subtend the reference voltage vector and to said at least one zero voltage vector when the reference voltage vector magnitude is less than a first predetermined threshold to produce AC output voltage in accord with a three-state mode of operation;

modulating only the inverter states corresponding to the angularly adjacent non-zero voltage vectors that subtend the reference voltage vector when the reference voltage vector magnitude is not less than said first predetermined threshold and is less than a second predetermined threshold to produce AC output voltage in accord with a two-state mode of operation; and, maintaining the inverter state corresponding to the non-zero voltage vector that is angularly closest to the reference voltage vector when the reference voltage vector magnitude is not less than said second predetermined threshold to produce AC output voltage in accord with a step mode of operation.

2. A method of synthesizing AC output voltage as claimed in claim 1 wherein said first predetermined threshold is established for each region as a function of the reference voltage vector angle from a respective voltage vector locus corresponding to complementary fractions of predetermined ones of said non-zero voltage vectors.

3. A method of synthesizing AC output voltage as claimed in claim 2 wherein said predetermined ones of said non-zero voltage vectors comprise the angularly adjacent non-zero voltage vectors that subtend the reference voltage vector.

4. A method of synthesizing AC output voltage as claimed in claim 3 wherein said second predetermined threshold comprises extrapolations of the voltage vector loci corresponding to the ones of the regions that are adjacent to the region delimited by the ones of the non-zero voltage vectors that subtend the reference voltage vector.

5. A method of synthesizing AC output voltage as claimed in claim 1, wherein said polyphase inverter comprises a three-phase inverter.

6. A method of synthesizing AC output voltage as claimed in claim 2, wherein said polyphase inverter comprises a three-phase inverter.

7. A method of synthesizing AC output voltage as claimed in claim 3, wherein said polyphase inverter comprises a three-phase inverter.

8. A method of synthesizing AC output voltage with a polyphase inverter having a plurality of power switches for coupling upper and lower DC rails to an inverter output, the inverter characterized by a plurality of inverter states corresponding to respective angularly distributed non-zero voltage vectors and at least one zero voltage vector, wherein angularly adjacent ones of said non-zero voltage vectors delimit respective regions, said inverter states corresponding to predetermined state configurations of said power switches, the method comprising the steps of:

providing a reference voltage vector having magnitude and angle;

modulating the inverter states corresponding to the angularly adjacent non-zero voltage vectors that subtend the reference voltage vector and to said at least one zero voltage vector when the reference voltage vector magnitude is less than a first threshold established for each region as a function of the reference voltage vector angle from a respective voltage vector locus corresponding to complementary fractions of predetermined ones of said non-zero voltage vectors to produce AC output voltage in accord with a three-state mode of operation;

modulating only the inverter states corresponding to the angularly adjacent non-zero voltage vectors that subtend the reference voltage vector when the reference voltage vector magnitude is not less than said first threshold and is less than a second threshold to produce AC output voltage in accord with a two-state mode of operation; and, maintaining the inverter state corresponding to the non-zero voltage vector that is angularly closest to the reference voltage vector when the reference voltage vector magnitude is not less than said second threshold to produce AC output voltage in accord with a step mode of operation.

9. A method of synthesizing AC output voltage as claimed in claim 8 wherein said second threshold comprises extrapolations of the voltage vector loci corresponding to the ones of the regions that are adjacent to the region delimited by the ones of the non-zero voltage vectors that subtend the reference voltage vector.

10. A method of synthesizing AC output voltage as claimed in claim 8, wherein said polyphase inverter comprises a three-phase inverter.

11. A method of synthesizing AC output voltage as claimed in claim 9, wherein said polyphase inverter comprises a three-phase inverter.

12. A method of synthesizing AC output voltage with a polyphase inverter in the region of non-linear response, the inverter having a plurality of power switches for coupling upper and lower DC rails to an inverter output and characterized by a plurality of inverter states corresponding to respective angularly distributed non-zero voltage vectors and at least one zero voltage vector, wherein angularly adjacent ones of said non-zero voltage vectors delimit respective regions, said inverter states corresponding to predetermined state configurations of said power switches, the method comprising the steps of:

providing a reference voltage vector having magnitude and angle;

controlling the inverter in one of first and second substantially steady state modes selected in accordance with the magnitude of the reference voltage vector, said first mode comprising a respective period of modulation of the inverter states corresponding to said at least one zero voltage vector and to the angularly adjacent non-zero voltage vectors that subtend the reference voltage vector for three state operation and a respective period of modulation of only the inverter states corresponding to said angularly adjacent non-zero voltage vectors that subtend the reference voltage vector for two-state operation, said second mode comprising a respective period of modulation of only the inverter states corresponding to said angularly adjacent non-zero voltage vectors that subtend the reference voltage vector for two-state operation and a respective period of maintaining the inverter state corresponding to the non-zero voltage vector that is angularly closest to the reference voltage vector for step operation.

13. A method of synthesizing AC output voltage as claimed in claim 12 wherein controlling the inverter in the first mode includes the steps of:

comparing the reference voltage vector magnitude to a predetermined threshold;

modulating the inverter states corresponding to said at least one zero voltage vector and the angularly adjacent non-zero inverter states that subtend the reference voltage vector when said reference voltage vector magnitude is below said predetermined threshold; and, modulating only the inverter states corresponding to the angularly adjacent non-zero voltage vectors that subtend the reference voltage vector when said reference voltage vector magnitude is not below said predetermined threshold.

14. A method of synthesizing AC output voltage as claimed in claim 12 wherein controlling the inverter in the second mode includes the steps of:

comparing the reference voltage vector magnitude to a predetermined threshold;

modulating only the inverter states corresponding to the angularly adjacent non-zero voltage vectors that subtend the reference voltage vector when said reference voltage vector magnitude is below said predetermined threshold; and, maintaining the inverter state corresponding to the voltage vector that is angularly closest to the reference voltage vector when said reference voltage vector magnitude is not below said predetermined threshold.

15. A method of synthesizing AC output voltage as claimed in claim 12 wherein the step of controlling the inverter in one of first and second substantially steady state modes includes the steps of:

comparing the reference voltage vector magnitude to a predetermined threshold;

selecting the first substantially steady state mode when the reference voltage vector magnitude is below said predetermined threshold; and, selecting the second substantially steady state mode when the reference voltage vector magnitude is not below said predetermined threshold.

16. A method of synthesizing AC output voltage as claimed in claim 15 wherein the step of controlling the inverter in the first mode comprises the steps of:

comparing the reference voltage vector to a predetermined set of parameters;

modulating the inverter states corresponding to said at least one zero voltage vector and to the angularly adjacent non-zero voltage vectors that subtend the reference voltage vector when said reference voltage vector is outside of the predetermined set of parameters; and, modulating only the inverter states corresponding to said angularly adjacent non-zero voltage vectors that subtend the reference voltage vector when the reference voltage vector is within the predetermined set of parameters.

17. A method of synthesizing AC output voltage as claimed in claim 15 wherein the step of controlling the inverter in the second mode comprises the steps of:

comparing the reference voltage vector to a predetermined set of parameters;

modulating only the inverter states corresponding to said angularly adjacent non-zero voltage vectors that subtend the reference voltage vector when the reference voltage vector is within the predetermined set of parameters; and, maintaining the inverter state corresponding to the non-zero voltage vector that is angularly closest to the reference voltage vector when the reference voltage vector is outside the predetermined set of parameters.

18. A method of synthesizing AC output voltage as claimed in claim 12 wherein the step of controlling the inverter in one of first and second substantially steady state modes comprises the steps of:

comparing the reference voltage vector to a predetermined set of parameters comprising first and second thresholds as respective functions of reference voltage vector angle, wherein the second threshold is not less than the first threshold at any reference voltage vector angle;

modulating the inverter states corresponding to said at least one zero voltage vector and to said angularly adjacent non-zero voltage vectors that subtend the reference voltage vector when said reference voltage vector is less than the first threshold at the reference voltage vector angle;

modulating only the inverter states corresponding to said angularly adjacent voltage vectors that subtend the reference voltage vector when said reference voltage vector is not less than the first threshold at the reference voltage vector angle and is less than the second threshold at the reference voltage vector angle; and, maintaining the inverter state corresponding to the non-zero voltage vector that is angulary closest to the reference voltage vector when the reference voltage vector is not less than the second threshold at the reference voltage vector angle.

19. A method of synthesizing AC output voltage as claimed in claim 12, wherein said polyphase inverter comprises a three-phase inverter.

20. A method of synthesizing AC output voltage as claimed in claim 15, wherein said polyphase inverter comprises a three-phase inverter.

21. A method of synthesizing AC output voltage as claimed in claim 18, wherein said polyphase inverter comprises a three-phase inverter.

22. A method of controlling a three-phase inverter to synthesize AC output voltage in response to a reference voltage vector traversing a plurality of angular regions delimited by angularly adjacent non-zero voltage vectors, said inverter having a plurality of power switches for coupling upper and lower DC rails to an inverter output and being adapted for space vector pulse width modulation wherein inverter states corresponding to respective angularly adjacent non-zero voltage vectors and at least one zero voltage vector are modulated for respective durations, for modified space vector modulation wherein only inverter states corresponding to angularly adjacent non-zero voltage vectors are modulated for respective durations, and for step operation wherein inverter states corresponding to non-zero voltage vectors are maintained for mutually exclusive respective durations, said inverter states corresponding to predetermined state configurations of said power switches, the method comprising for each angular region the steps of:

commutating the inverter for respective angular durations as said reference voltage vector traverses through angularly opposite ends of the region with one of space vector pulse width modulation and step operation, said respective angular durations being separated by an angularly intermediate duration; and, commutating the inverter for said angularly intermediate duration with modified space vector modulation.

23. The method of controlling a three-phase inverter as claimed in claim 22 wherein the step of commutating the inverter for respective angular durations at angularly opposite ends of the region further comprises the steps of:

selecting the one of space vector pulse width modulation and step operation in accordance with predetermined parameters of the reference voltage vector.

24. The method of controlling a three-phase inverter as claimed in claim 23 wherein the predetermined parameters of the reference voltage vector comprise first and second thresholds as respective functions of the reference voltage vector angle, wherein the second threshold is not less than the first threshold at any reference voltage vector angle, the step of selecting the one of space vector pulse width modulation and step operation further comprising the steps of;

selecting space vector pulse width modulation when the reference voltage vector magnitude is less than the first threshold; and, selecting step operation when the reference voltage vector magnitude is less than the second threshold.

25. The method of controlling an inverter as claimed in claim 22 wherein the steps of commutating the inverter for the respective angular durations at angularly opposite ends of the region and for said angularly intermediate duration comprises the step of:

comparing the reference voltage vector magnitude to first and second thresholds as respective functions of the reference voltage vector angle, wherein the second threshold is not less than the first threshold at any reference voltage vector angle;

commutating the inverter with space vector pulse width modulation when the reference voltage vector magnitude is less than the first threshold;

commutating the inverter with step operation when the reference voltage vector magnitude is not less than the second threshold; and, commutating the inverter with modified space vector modulation when the reference voltage vector magnitude is not less than the first threshold and is less than the second threshold.

26. The method of controlling an inverter as claimed in claim 22 wherein the angular durations at angularly opposite ends of the region and the angularly intermediate duration are determined in accordance with predetermined parameters of the reference voltage vector.

27. The method of controlling an inverter as claimed in claim 26 wherein the predetermined parameters of the reference voltage vector comprise first and second thresholds as respective functions of the reference voltage vector angle, wherein the second threshold is not less than the first threshold at any reference voltage vector angle, said intermediate angular duration corresponding to the reference voltage vector magnitude being substantially intermediate the first and second thresholds, and said angular durations at angularly opposite ends of the region corresponding to the reference voltage vector magnitude being substantially not intermediate the first and second thresholds.

28. The method of controlling a three-phase inverter as claimed in claim 27 wherein the steps of commutating the inverter for the respective angular durations at angularly opposite ends of the region and for said intermediate duration comprises the step of:

comparing the reference voltage vector magnitude to first and second thresholds;

commutating the inverter with space vector pulse width modulation when the reference voltage vector magnitude is less than the first threshold;

commutating the inverter with step operation when the reference voltage vector magnitude is not less than the second threshold; and, commutating the inverter with modified space vector modulation when the reference voltage vector magnitude is not less than the first threshold and is less than the second threshold.

* * * * *